US012562636B2

(12) United States Patent
Salmia et al.

(10) Patent No.: US 12,562,636 B2
(45) Date of Patent: Feb. 24, 2026

(54) METHOD FOR OPERATING ELECTRIC POWER CONVERTER AND ELECTRIC POWER CONVERTER

(71) Applicant: ABB Schweiz AG, Baden (CH)

(72) Inventors: Teemu Salmia, Helsinki (FI); Markus Vilkki, Helsinki (FI); Timo Kantola, Helsinki (FI)

(73) Assignee: ABB Schweiz AG, Baden (CH)

( * ) Notice: Subject to any disclaimer, the term of this patent is extended or adjusted under 35 U.S.C. 154(b) by 274 days.

(21) Appl. No.: 18/527,645

(22) Filed: Dec. 4, 2023

(65) Prior Publication Data

US 2024/0195290 A1     Jun. 13, 2024

(30) Foreign Application Priority Data

Dec. 8, 2022     (EP) .................................... 22212133

(51) Int. Cl.
*H02M 7/539*     (2006.01)
*H02M 1/32*     (2007.01)
(52) U.S. Cl.
CPC .......... *H02M 1/325* (2021.05); *H02M 7/539* (2013.01)
(58) Field of Classification Search
CPC .............................. H02M 1/325; H02M 7/539
See application file for complete search history.

(56) References Cited

U.S. PATENT DOCUMENTS

| | | | |
|---|---|---|---|
| 12,418,170 B2 * | 9/2025 | Chivite Zabalza . | H02M 1/0045 |
| 2025/0138108 A1 * | 5/2025 | Kantola ................. | G01R 31/52 |

FOREIGN PATENT DOCUMENTS

CN     101355319 A     1/2009

OTHER PUBLICATIONS

Gkountaras, Aris, et al.; "Evaluation of current limiting methods for grid forming inverters in medium voltage microgrids"; 2015 IEEE Energy Conversion Congress and Exposition (ECCE); Montreal, QC, Canada; Sep. 20, 2015; 8 Pages.
De Stasi, Frank; "Know Your Limits"; Texas Instruments Application Report; Texas Instruments Inc.; May 31, 2016; 16 Pages.
ONSEMI; "On Semiconductor: Buck Regulator—Synchronous"; Semiconductor Components Industries, LLC; Aug. 31, 2019; 18 Pages.
Du, Wei, et al.; "A Current Limiting Control Strategy for Single-Loop Droop-Controlled Grid-Forming Inverters Under Balanced and Unbalanced Faults"; 2022 IEEE Energy Conversion Congress and Exposition (ECCE); Detroit, MI, USA; Oct. 9, 2022; 7 Pages.
European Seach Report; Application No. EP 22 21 2133; Issued: May 3, 2023; 4 Pages.

* cited by examiner

*Primary Examiner* — Adolf D Berhane
(74) *Attorney, Agent, or Firm* — Whitmyer IP Group LLC

(57)     ABSTRACT

A method for operating an electric power converter, and an electric power converter including a plurality of controllable power semiconductor switches and configured to operate in a grid-forming mode of operation such that the controllable power semiconductor switches are operated at a first switching frequency, and in response to detecting a short-circuit fault in an AC network connected to the electric power converter provide an AC current of at least a predetermined magnitude to the AC network such that the controllable power semiconductor switches are operated at a second switching frequency, wherein the second switching frequency is lower than the first switching frequency.

16 Claims, 2 Drawing Sheets

METHOD FOR OPERATING ELECTRIC POWER CONVERTER AND ELECTRIC POWER CONVERTER

TECHNICAL FIELD

The present invention relates to a method for operating an electric power converter, and to an electric power converter.

BACKGROUND

An electric power converter, such as an inverter or a frequency converter, may be configured to operate in a grid-forming manner or in a grid-following manner. In contrast to grid-following converters, grid-forming converters can make use of their own voltage and frequency references. Grid-forming converters are thus able to create a stable grid voltage, and hence can form and maintain a grid (an AC network), such as a microgrid, on their own without having to rely on e.g. synchronous generators.

An electric power converter may also be able to operate both in the grid-forming manner and in the grid-following manner depending on the situation, for instance. As an example, such converter may operate in the grid-following manner in a grid connected situation, when the converter is connected to a grid with a stable voltage, and in the grid-forming manner in an islanding (islanded) situation, i.e. when the converter is without such grid connection. Sometimes such converter may be referred as an off-grid converter.

When an electric power converter operates in the grid-forming manner and a short-circuit fault occurs in an AC network created by the electric power converter, this is seen as a power shock by the electric power converter. In such a short-circuit situation the electric power converter may be required to provide sufficient short-circuit current to ensure that short-circuit protection, such as fuses, operates reliably.

A problem related to the above situation is that the short-circuit current supply capability of the electric power converter may be limited by the dimensioning of the electric power converter and in particular of the power semiconductor switches therein, for instance. Then, in order to be able to provide a required and sufficient short-circuit current, the electric power converter may need to be overdimensioned with respect to its nominal power, for example. Such overdimensioning may then cause additional costs and increase the size of the electric power converter.

SUMMARY

An object of the present invention is thus to provide a method and an apparatus for implementing the method so as to overcome the above problem or at least to alleviate the problem. The objects of the invention are achieved by a method, a computer readable medium and an electric power converter which are characterized by what is stated in the independent claims. The preferred embodiments of the invention are disclosed in the dependent claims.

The invention is based on the idea of operating an electric power converter in a grid-forming mode of operation such that controllable power semiconductor switches of the electric power converter are operated at a first switching frequency, and, in response to detecting a short-circuit fault in an AC network connected to an AC output of the converter, controlling the electric power converter to provide an AC current of at least a predetermined magnitude to the AC network connected to the AC output of the converter such that the controllable power semiconductor switches are operated at a second switching frequency which is lower than the first switching frequency.

An advantage of the solution is that losses of the controllable power semiconductor switches of the electric power converter can be reduced during the short-circuit situation and hence more short-circuit current can be supplied without a need to change the dimensioning of the converter or components associated therewith, and essentially without affecting the normal operation of the electric power converter.

BRIEF DESCRIPTION OF THE DRAWINGS

In the following the invention will be described in greater detail by means of preferred embodiments with reference to the accompanying drawings, in which.

DETAILED DESCRIPTION

The following embodiments are exemplary. Although the description may refer to "an", "one", or "some" embodiment (s) in several locations, this does not necessarily mean that each such reference is to the same embodiment(s), or that the feature only applies to a single embodiment, for example. Single features of different embodiments may also be combined to provide other embodiments. Generally, all terms and expressions used should be interpreted broadly and they are intended to illustrate, not to restrict, the embodiments. The figures only show components necessary for understanding the various embodiments. The number and/or configuration of the various elements, and generally their implementation, could vary from the examples shown in the figures. Moreover, different embodiments and examples may be described herein using single units, models, equipment and memory, without restricting the embodiments/examples to such a solution. It is also possible that device operations will be distributed among a plurality of devices or elements. Therefore, all words and expressions should be interpreted broadly, and they are intended to illustrate, not to restrict, the embodiment in question. The application of the various embodiments described herein is not limited to any specific system, but they can be used in connection with various electric systems. Moreover, the use of the various embodiments described herein is not limited to systems employing any specific fundamental frequency or any specific voltage level, for example.

Figure 1:
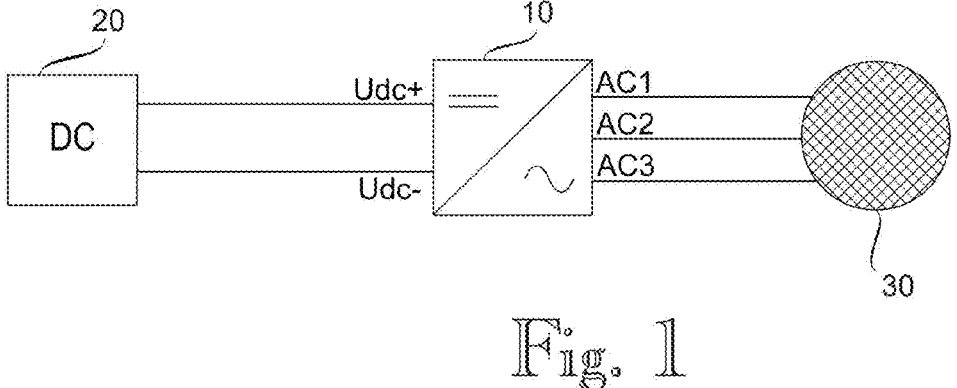
FIG. 1 illustrates an example of an electric system according to an embodiment.

FIG. 1 illustrates a simplified example of an electric system. The figure shows only components necessary for understanding the various embodiments. The exemplary system of FIG. 1 comprises an electric power converter 10, which in this example is an inverter, which can operate at least as a DC-to-AC converter. Consequently, the exemplary electric power converter 10 may comprise a suitable electronic device or circuitry that is able to convert direct current (DC) to alternating current (AC). The electric power converter 10 may be configured to operate as a single-stage inverter or as a multi-stage inverter and hence comprise two or more converter stages, for instance. The exemplary electric power converter 10 could also be configured to function both as a rectifier and as an inverter, i.e., to be able to rectify alternating current into direct current and convert direct current into alternating current depending on its mode of operation, for example. The circuit configuration of the electric power converter 10 may vary and the electric power converter 10 may generally be any kind of electric power converter comprising at least one inverter or corresponding functionality, for instance. As an example, the electric power converter could be a frequency converter. Herein term 'inverter' generally refers to an electronic device or circuitry, for example, that is able to convert direct current to alternating current, and term 'rectifier' generally refers to an electronic device or circuitry, for example, that is able to convert alternating current to direct current. Moreover, instead of three phases, the converter 10 could have another number of AC phases, e.g. one, two or six.

In the example of FIG. 1 the exemplary electric power converter 10 is connected to a power source 20. In the example of FIG. 1 the power source is a DC power source to which DC poles Udc+, Udc− of the exemplary electric power converter 10 are connected. There may be one or more switches (not shown) between the electric power converter 10 and the DC power source 20 enabling the connection and disconnection of the electric power converter to/from the DC power source. An example of such a DC power source 20 a photovoltaic (PV) power generation system comprising one or more photovoltaic panel, for instance. Another example of a possible DC power source 20 is a wind power generation system, such as a wind farm, which may comprise one or more wind generators, driven by one or more wind turbines, for instance. Such wind generator may be an AC (synchronous or asynchronous) generator provided with suitable rectifier means or a DC generator, for example. Other type(s) of DC power source(s) or combinations thereof could also be utilized alternatively or additionally, such as a fuel cell DC power source. Depending on the type of the electric power converter 10, it could also be connected to an AC power source, for example. Further, an AC output of the electric power converter 10, represented by exemplary AC poles AC1, AC2, AC3 in exemplary FIG. 1, is connected to an AC network 30, such as an electrical grid or another kind of AC network, e.g. in order to supply power from the DC power source 20 (or AC power source) to the AC network 30, when the electric system is in normal operation. There may be one or more switches (not shown) between the electric power converter 10 and the AC network 30, enabling the connection and disconnection of the electric power converter 10 to/from the AC network 30. The AC connection between the electric power converter 10 and the AC network 30 may have one or more phases, e.g. three phases as illustrated in the example of FIG. 1. The electric system may further comprise any number of additional components such as switches, filters and/or fuses, which have not been shown in the figure for the sake of clarity.

Figure 2:
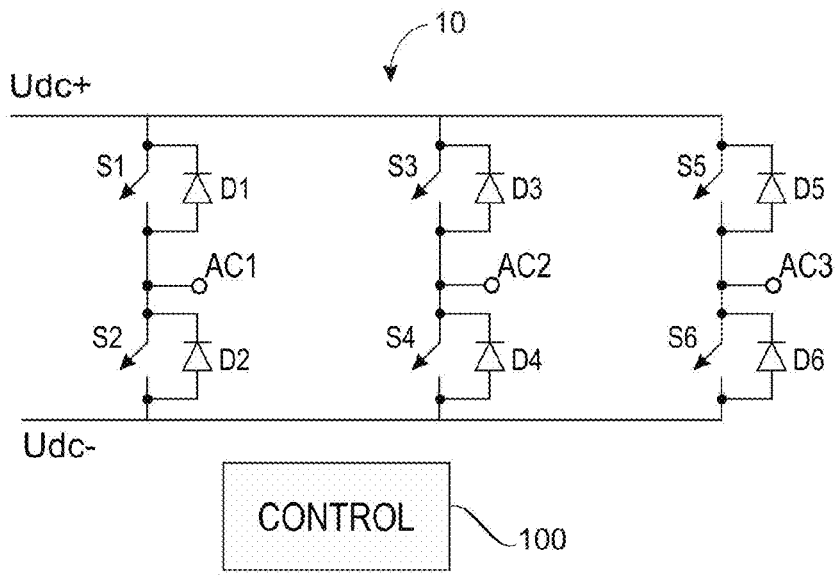
FIG. 2 illustrates an example of a circuit diagram according to an embodiment.

FIG. 2 illustrates an example of an electric power converter 10 according to an embodiment. The exemplary electric power converter of FIG. 2 is a two-level three-phase converter that can function both as an inverter and also as a rectifier, and the main circuit thereof comprises three switching branches. The number of levels and phases of the electric power converter 10 could vary from the illustrated example. As an example, the electric power converter 10 could be a multilevel, e.g. three-level, converter, such as an NPC (Neutral Point Clamped) converter or an ANPC (Active Neutral Point Clamped) converter, for example. In the exemplary two-level configuration of FIG. 2, the first switching branch comprises controllable semiconductor switches S1 and S2, and their antiparallel diodes D1 and D2, respectively. The second switching branch comprises controllable semiconductor switches S3 and S4, and their antiparallel diodes D3 and D4, respectively. The third switching branch comprises controllable semiconductor switches S5 and S6, and their antiparallel diodes D5 and D6, respectively. The controllable semiconductor switches S1 to S6 may be any kind of controllable power semiconductor switches, such as IGBTs (Insulated-Gate Bipolar Transistor) or FETs (Field-Effect Transistor), which can be controlled according to a modulation or control scheme used, for example. The number and configuration of the controllable semiconductor switches may vary from the illustrated example depending on the converter characteristics, for example.

The exemplary electric power converter 10 of FIG. 2 further comprises a control arrangement 100, which is configured to control the operation of the electric power converter 10. For the sake of clarity, no internal control connections between the control arrangement 100 and other components of the electric power converter 10, such as the controllable semiconductor switches S1 to S6, are shown in the figure. The control arrangement 100 may be comprised of one or more physical and/or logical units and one control arrangement 100 may control a plurality of electric power converters 10. The control arrangement 100 may also be configured to perform various measurements, e.g. current and/or voltage measurements, in the electric power converter 10 and/or other entities connected to the electric power converter 10, such as the AC network 30. Such measurements may be implemented by means of suitable measuring arrangements, e.g. within the electric power converter 10, which have not been shown separately in the figures. The functionality according to the various embodiments described herein may be implemented at least partly by means of the control arrangement 100. Moreover, the control arrangement 100 may also control the normal operation of the electric power converter 10 by controlling the controllable semiconductor switches S1 to S6 in a suitable manner according to a modulation scheme or control scheme used, for example. An example of a possible modulation scheme is a pulse width modulation (PWM). According to an embodiment, the normal operation of the electric power converter 10 may include converting by the converter 10 power from a power source into AC power supplied to the AC network 30 connected to the AC output the electric power converter.

Figure 3:
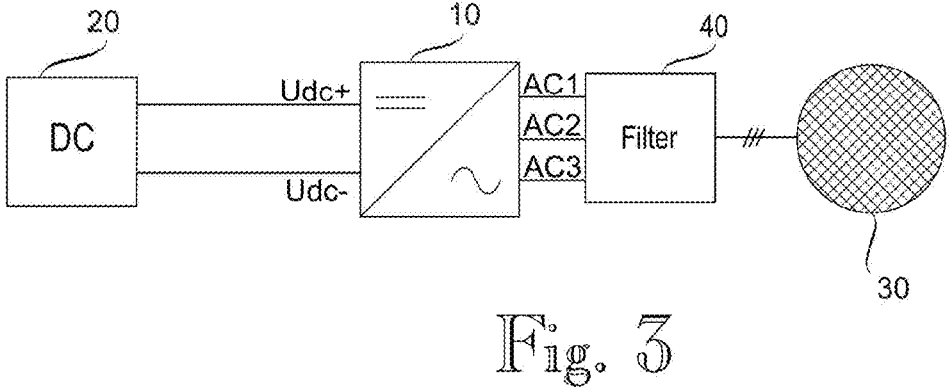
FIG. 3 illustrates an example of an electric system according to an embodiment.

FIG. 3 illustrates another example of an electric system. The example of FIG. 3 corresponds to that of FIG. 1 but additionally comprises an output filter 40 connected to the AC output of the electric power converter 10. According to an embodiment, the output 40 filter may comprise at least one inductive component and at least one capacitive component. The output filter 40 may be an LCL filter or an LC filter, for example. While exemplary FIG. 3 shows the output filter 40 as a separate element, it could be structurally part of the electric power converter 10, e.g. provided within a common housing.

According to an embodiment, the electric power converter 10 is configured to be operable at least in a grid-forming manner, i.e. in a grid-forming mode of operation. Thus, the electric power converter 10 is capable of creating a stable voltage in an AC network 30 connected thereto. This may include providing and sustaining (maintaining), by the electric power converter 10, an AC voltage of a predetermined magnitude and a predetermined frequency at the AC network 30 connected to the AC output of the converter. The electric power converter 10 can use its own voltage and frequency references for this purpose, for instance. According to an embodiment, the electric power converter 10 may be configured to be additionally operable in a grid-following manner, i.e. in a grid-following mode of operation. Thus, the electric power converter 10 may be able to operate both in the grid-forming manner and in the grid-following manner depending on the situation, for instance. As an example, electric power converter 10 may be configured to operate in the grid-following manner in a grid connected situation, when the converter is connected to a grid with a stable voltage provided by one or more other entities connected to the network, whereby the electric power converter 10 can in the grid-following mode of operation synchronize itself with the already established voltage of such grid. As another example, electric power converter 10 may be configured to operate in the grid-forming mode of operation e.g. in an islanding (islanded) situation, i.e. when the power converter is without such grid connection to a stable grid (e.g. a wide area synchronous grid, i.e. a macrogrid) and needs to create the AC network by itself, for example. Such AC network created by the electric power converter 10 may also be referred to as a stand-alone (micro)grid or an isolated (micro)grid. Electric power converters with such functionality can be utilized where a stable power grid is not readily or cost-effectively available, such as in connection with renewable energy production or on ships with a large capacity battery system and/or a fuel cell system, for instance.

If a short-circuit occurs in an AC network created by the electric power converter 10, which is operating in the grid-forming mode of operation, the electric power converter can see the short-circuit as a power shock. In such a short-circuit situation the electric power converter may be required to provide sufficient short-circuit current to ensure that short-circuit protection, such as fuses, operates reliably. The required short-circuit current level and/or duration may be predetermined.

The maximum possible supply capacity of short-circuit current of electric power converter may be influenced by various circumstances, such as under what conditions (e.g. environment and electrical operating point) a short-circuit occurs, how large the current measurement range is in the power converter, and/or how much the controllable power semiconductor switches of the power converter can withstand the short-term load without heating up too much, for example. Often, excessive warming of the controllable power semiconductor switches may be the limiting factor.

Losses ($P_{IGBT}$) of controllable power semiconductor switches, such as IGBT, essentially consist of on-state ($P_{ON\_IGBT}$) and switching state ($P_{SW\_IGBT}$) losses:

$$P_{IGBT}=P_{ON\_IGBT}+P_{SW\_IGBT}$$

The switching losses of an IGBT module, for example, can be calculated during a period T by assuming the losses to be linear as a function of an output current and a DC voltage:

$$P_{SW\_IGBT}=(E_{ON\_IGBT}+E_{OFF})*(U_{DC}*Iv)/(U_{CE}*Ic)*n_{sw}/T,$$

where
$E_{ON\_IGBT}$ [J]=IGBT turn-on losses at an indicated voltage and current
$E_{OFF}$ [J]=IGBT turn-off losses at an indicated voltage and current $U_{CE}$ [V]=Voltage at which switching losses are indicated
Ic [A]=Current at which switching losses are indicated
$U_{Dc}$ [V]=DC voltage at the operating point
Iv [A]=Phase current during calculation period T
$n_{sw}$/T=Number of switching cycles during calculation period T
T [s]=Length of calculation period The higher the switching frequency used in the device (the number of switching cycles per unit of time), the higher the switching losses will be and the greater the proportion of the losses of the device will consist of the switching losses. As an example, for IGBT modules with rated 1700V maximum voltage, the relative share of switching losses in total losses is clearly higher than for IGBT modules with rated 1200V maximum voltage.

The temperature of the p-n junction of silicon in an IGBT module (denoted $T_J$) can be calculated as follows:

$$T_J=P_{IGBT}*R_{TH\_JC}+P_{IGBT}*R_{TH\_CS}+P_{TOT}*R_{TH\_SA}+T_A,$$

where
$P_{IGBT}$ [W]=IGBT losses
$P_{TOT}$ [W]=total IGBT module losses (diode losses included)
$R_{TH\_JC}$ [C/W]=IGBT thermal resistance from junction to housing
$R_{TH\_CS}$ [C/W]=IGBT thermal resistance from housing to heatsink
$R_{TH\_SA}$ [C/W]=IGBT thermal resistance at the junction with the heatsink to the coolant
$T_A$ [C]=coolant temperature As can be seen, the higher the switching losses are, the higher the resulting temperature will be.

According to an embodiment, an electric power converter 10 comprising a plurality of controllable power semiconductor switches S1-S6 and an AC output with one or more phases AC1, AC2, AC3 is operated in a grid-forming mode of operation comprising controlling the plurality of controllable power semiconductor switches S1 to S6 to provide and sustain an AC voltage of a predetermined magnitude and a predetermined frequency at an AC network 30 connected to the AC output of the electric power converter such that the controllable power semiconductor switches S1 to S6 are operated at a first switching frequency. The predetermined magnitude and the predetermined frequency of the voltage at the AC network 30 may depend on the characteristics and requirements of the network in question. The predetermined magnitude and the predetermined frequency of the voltage at the AC network 30 may be defined e.g. as target values with possible permissible variation or as ranges or as average values, for example. The electric power converter 10 being operated in the grid-forming mode of operation may be the only electric power converter feeding the AC network 30 or the only electric power converter feeding the AC network 30 in the grid-forming mode of operation, for example. It is also possible that there are two or more electric power converters 10 being operated in the grid-forming mode of operation and feeding the AC network 30 in parallel, for instance. Moreover, according to an embodiment, a short-circuit fault in the AC network 30 connected to the AC output of the electric power converter 10 is detected during the operating of the electric power converter in the grid-forming mode of operation, and in response to the detecting of the short-circuit fault, the plurality of controllable power semiconductor switches S1 to S6 are controlled to provide an AC current of at least a predetermined magnitude to the AC network 30 connected to the AC output of the electric power converter 10 such that the controllable power semiconductor switches S1 to S6 are operated at a second switching frequency, wherein the second switching frequency is lower than the first switching frequency. By lowering the switching frequency of the controllable power semiconductor switches S1 to S6 of the power converter 10 the losses of the controllable power semiconductor switches S1 to S6 and hence their temperature increase can be reduced or limited and consequently a higher current can be supplied to the AC network 30 by the power converter 10 during the short-circuit fault, for example. The predetermined magnitude of the AC current provided to the AC network 30 may depend on the characteristics and requirements of the network in question and/or the electric power converter 10, for instance. As an example, the predetermined magnitude of the AC current provided to the AC network 30 may be defined or determined such that it is high enough to ensure that short-circuit protection, such as fuses, operates reliably. Moreover, the predetermined magnitude of the AC current provided to the AC network 30 may be a predetermined fixed value or value range, and/or may be predetermined by or via one or more equations, for example.

According to an embodiment, the AC current of the at least the predetermined magnitude is provided to the AC network 30 connected to the AC output of the electric power converter 10 continuously at least for a predetermined period of time or until the detected short-circuit fault in the AC network 30 is removed or until the AC current provided to the AC network 30 is interrupted in the AC network 30, for example. The predetermined period of time, i.e. the length of it, may depend on the characteristics and requirements of the network 30 in question and/or the electric power converter 10 in question, for instance. As an example, the predetermined period of time may be defined or determined such that it is long enough to ensure that short-circuit protection, such as fuses, can operate reliably. If the detected short-circuit fault in the AC network 30 is removed, e.g. the fault ends or disappears, before the predetermined period of time ends, then the providing of the AC current may also end before the predetermined period of time ends. Additionally or alternatively, if the AC current provided to the AC network 30 is interrupted in the AC network 30, e.g. by short-circuit protection equipment in the AC network 30, the providing of the AC current provided to the AC network 30 may also end before the predetermined period of time ends.

According to an embodiment, the (first and/or second) switching frequency may be an average switching frequency or defined or determined in another suitable way. For example, the electric power converter 10 may in the normal operation thereof use an essentially fixed switching frequency and hence the first switching frequency may be essentially constant. Alternatively, the electric power converter 10 may in the normal operation thereof use a variable switching frequency, e.g. within a predetermined range, and hence the first switching frequency may be variable. The second switching frequency may be essentially constant or variable, e.g. within a predetermined range.

Figure 4:
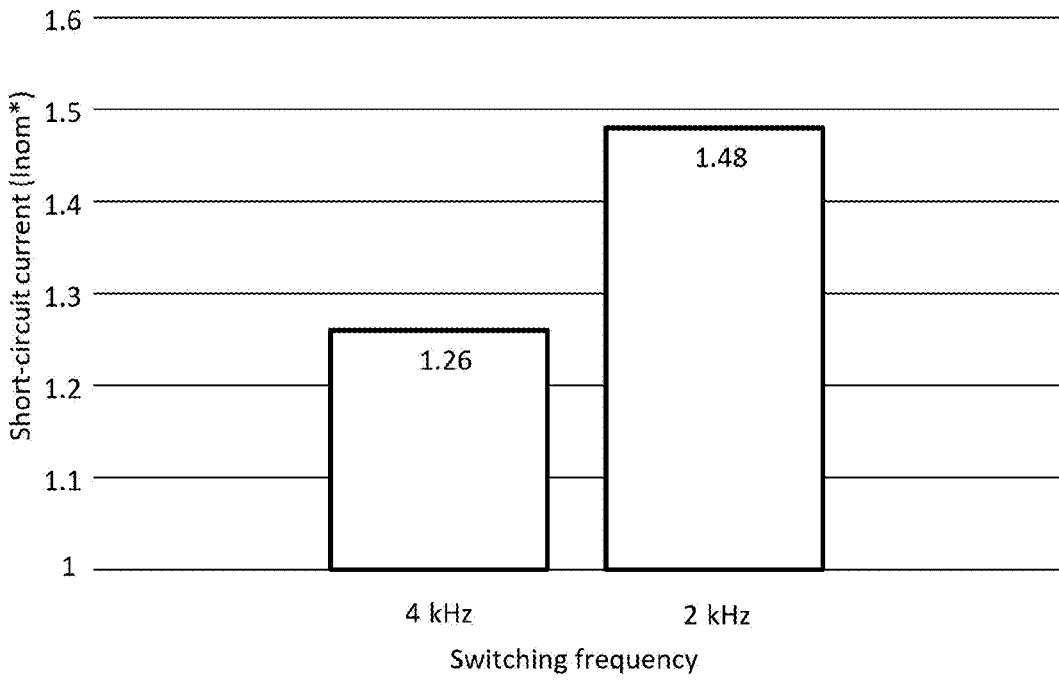
FIG. 4 is an exemplary diagram illustrating short-circuit current output capacities with different switching frequencies.

According to an embodiment, the second switching frequency may be about 95% of the first switching frequency or lower. According to an embodiment, the second switching frequency may be about 90% of the first switching frequency or lower. According to an embodiment, the second switching frequency may be about 80% of the first switching frequency or lower. According to an embodiment, the second switching frequency may be about 70% of the first switching frequency or lower. According to an embodiment, the second switching frequency is about 50% of the first switching frequency or lower. The first and second switching frequencies may be selected based on the system requirements and characteristics, for example. FIG. 4 shows an example of a short-circuit current output capacities of an exemplary power converter with two different switching frequencies, 4 kHz and 2 kHz. In the exemplary case, the current output can be increased over 17% (1.48 to 1.26) by decreasing the switching frequency by 50% (4 kHz to 2 kHz). According to an embodiment, the second switching frequency may be selected as low as possible considering possible limitations set by the network 30 in question and/or the electric power converter 10 in question, for instance. As an example, lowering the switching frequency too much may increase a ripple in the output current, and the acceptable level of such ripple may set a possible lower limit for the second switching frequency. According to an embodiment, the second switching frequency is preferably at least twice as high as a resonance frequency of an output filter 40 connected between the AC output of the power converter 10 and the AC network 30. This way sufficient damping may be ensured, when an output filter 40 is used.

According to an embodiment, a short-circuit fault occurring in the AC network 30 to be detected may be any kind of short-circuit fault and may occur between two or more phases of the AC network 30 or between a phase or phases and neutral of the AC network 30, for instance. According to an embodiment, a short-circuit fault occurring in the AC network 30 may be detected on the basis of output current of the electric power converter 10 to the AC network 30 exceeding a predetermined current threshold, for example, or by any other suitable criteria. The detection of the short-circuit fault may also be based on an indication of the fault received from another entity, such as a protective device, separate from the electric power converter 10, for instance. Thus, the electric power converter 10 may be configured to detect the short-circuit fault occurring in the AC network 30 essentially independently or the detection of the short-circuit fault may involve one or more other entities within the AC network 30 or connected thereto, for example. Upon the occurrence of a short-circuit fault, the highest (momentary) current peak value may often occur in the first peak value of the AC current flowing from the electric power converter 10 to the AC network 30. In some cases, however, the highest (momentary) current peak value may occur during the next period of the AC current, for example. Therefore, it may be preferable, upon detection of the short-circuit fault, to wait and observe the AC current for two or more periods thereof in order to detect and/or determine the highest current peak value. According to an embodiment, the lowering of the switching frequency from the first switching frequency to the second switching frequency may be performed, after detecting the short-circuit fault, only after a two or more periods (or a predetermined number thereof) of the AC current and/or after the detection or determination of the highest peak value of the AC current.

According to an embodiment, if the electric power converter 10 is additionally configured to be operable in the grid-following manner, i.e. in the grid-following mode of operation, the change of the switching frequency in a short-circuit situation as described above may be applied in corresponding manner during such operation in the possible grid-following mode of operation. Thus, according to an embodiment, which may be combined with any of the embodiments described above, the electric power converter 10 comprising the plurality of controllable power semiconductor switches S1 to S6 and the AC output with one or more phases AC1, AC2, AC3 may be operated in the grid-following mode of operation comprising controlling the plurality of controllable power semiconductor switches S1 to S6 to provide AC power to the AC output of the electric power converter such that the controllable power semiconductor switches S1 to S6 are operated at a third switching frequency. Moreover, a short-circuit fault in the AC network 30 connected to the AC output of the electric power converter 10 may be detected during the operating of the electric power converter in the grid-following mode of operation, and in response to the detecting of the short-circuit fault, the plurality of controllable power semiconductor switches S1 to S6 may be controlled to provide the AC current of at least the predetermined magnitude to the AC network 30 connected to the AC output of the electric power converter 10 such that the controllable power semiconductor switches S1 to S6 are operated at a fourth switching frequency, wherein the fourth switching frequency is lower than the third switching frequency. The third switching frequency and the fourth switching frequency in this embodiment may correspond to and be determined in the same way as the first switching frequency and the second switching frequency respectively.

The exemplary control arrangement 100 or other means for implementing at least part of the functionality according to any one of the embodiments disclosed herein, or a combination thereof, may be implemented as one physical unit or as two or more separate physical units that are configured to implement the functionality. Herein the term 'unit' generally refers to a physical or logical entity, such as a physical device or a part thereof or a software routine. The control arrangement 100 or other means for implementing at least part of the functionality according to any one of the embodiments herein may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the various embodiments, or a part thereof, may further comprise suitable input means for receiving e.g. measurement and/or control data, and output means for outputting e.g. control or any other data, such as the determined thermal load. It is also possible to use a specific integrated circuit or circuits, such as application-specific integrated circuits (ASIC), digital signal processing devices (DSPD), programmable logic devices (PLD), field-programmable gate arrays (FPGA) and/or discrete electric components and devices for implementing the functionality according to any one of the embodiments.

The embodiments described herein may be implemented in an existing electric system component(s) such an as electric power converter device(s). Electric power converter devices may comprise processors and memory that may be utilized in the functions according to the various embodiments described herein. Thus, at least some modifications and configurations possibly required for implementing an embodiment could be performed as software routines, which may be implemented as added or updated software routines. If at least part of the functionality of any of the embodiments is implemented by software, such software may be generally provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing any of the embodiments may be loaded to the unit or units executing the computer program code via a suitable data network, for example, and it may replace or update a possibly existing program code. An embodiment may provide a computer readable medium comprising program instructions for causing a computing apparatus controlling an electric power converter to carry out a method according to any one of the embodiments described herein. An embodiment may provide a computer program embodied on any client-readable distribution/data storage medium or memory unit(s) or article(s) of manufacture, comprising program instructions executable by one or more processors/computers, which instructions, when loaded into an apparatus, constitute the monitoring arrangement, or any corresponding unit or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the possible units/sub-units and/or algorithms for one or more functions/operations described above may be an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

The invention claimed is:

1. A method for operating an electric power converter, the electric power converter comprising a plurality of controllable power semiconductor switches and an AC output with one or more phases, the method comprising:

operating the electric power converter in a grid-forming mode of operation including controlling the plurality of controllable power semiconductor switches to provide and sustain an AC voltage of a predetermined magnitude and a predetermined frequency at an AC network connected to the AC output of the electric power converter such that the controllable power semiconductor switches are operated at a first switching frequency;

detecting a short-circuit fault in the AC network connected to the AC output of the electric power converter during the operating of the electric power converter in the grid-forming mode of operation; and in response to the detecting of the short-circuit fault, controlling the plurality of controllable power semiconductor switches to provide an AC current of at least a predetermined magnitude to the AC network connected to the AC output of the electric power converter such that the controllable power semiconductor switches are operated at a second switching frequency, wherein the second switching frequency is lower than the first switching frequency.

2. The method of claim 1, wherein the AC current of at least the predetermined magnitude is provided to the AC network connected to the AC output of the electric power converter continuously at least for a predetermined period of time or until the detected short-circuit fault in the AC network is removed or until the AC current provided to the AC network is interrupted in the AC network.

3. The method of claim 1, wherein the switching frequency is an average switching frequency.

4. The method of claim 1, wherein the second switching frequency is about 95% of the first switching frequency or lower.

5. The method of claim 4, wherein the second switching frequency is about 90% of the first switching frequency or lower, preferably about 80% of the first switching frequency or lower, more preferably about 70% of the first switching frequency or lower, and most preferably about 50% of the first switching frequency or lower.

6. The method of claim 1, wherein the second switching frequency is at least twice as high as a resonance frequency of an output filter connected between the AC output of the electric power converter and the AC network.

7. A computer readable medium storing program instructions for causing a computing apparatus controlling an electric power converter to carry out the following:

operate the electric power converter in a grid-forming mode of operation including controlling the plurality of controllable power semiconductor switches to provide and sustain an AC voltage of a predetermined magnitude and a predetermined frequency at an AC network connected to the AC output of the electric power converter such that the controllable power semiconductor switches are operated at a first switching frequency;

detect a short-circuit fault in the AC network connected to the AC output of the electric power converter during the operating of the electric power converter in the grid-forming mode of operation; and in response to the detecting of the short-circuit fault, control the plurality of controllable power semiconductor switches to provide an AC current of at least a predetermined magnitude to the AC network connected to the AC output of the electric power converter such that the controllable power semiconductor switches are operated at a second switching frequency, wherein the second switching frequency is lower than the first switching frequency.

8. An electric power converter, the electric power converter comprising:

a plurality of controllable power semiconductor switches;

an AC output with one or more phases; end a control arrangement configured to:

operate the electric power converter in a grid-forming mode of operation including controlling the plurality of controllable power semiconductor switches to provide and sustain an AC voltage of a predetermined magnitude and a predetermined frequency at an AC network connected to the AC output of the electric power converter such that the controllable power semiconductor switches are operated at a first switching frequency;

detect a short-circuit fault in the AC network connected to the AC output of the electric power converter during the operating of the electric power converter in the grid-forming mode of operation; and in response to the detecting of the short-circuit fault, control the plurality of controllable power semiconductor switches to provide an AC current of at least a predetermined magnitude to the AC network connected to the AC output of the electric power converter such that the controllable power semiconductor switches are operated at a second switching frequency, wherein the second switching frequency is lower than the first switching frequency.

9. The electric power converter of claim 8, wherein the AC current of at least the predetermined magnitude is provided to the AC network connected to the AC output of the electric power converter continuously at least for a predetermined period of time or until the detected short-circuit fault in the AC network is removed or until the AC current provided to the AC network is interrupted in the AC network.

10. The electric power converter of claim 8, wherein the switching frequency is an average switching frequency.

11. The electric power converter of claim 8, wherein the second switching frequency is about 95% of the first switching frequency or lower.

12. The electric power converter of claim 11, wherein the second switching frequency is about 90% of the first switching frequency or lower, preferably about 80% of the first switching frequency or lower, more preferably about 70% of the first switching frequency or lower, and most preferably about 50% of the first switching frequency or lower.

13. The electric power converter of claim 8, wherein the electric power converter is configured to be operable in the grid-forming mode of operation and in a grid-following mode of operation.

14. The electric power converter of claim 8, wherein the electric power converter is an inverter or a frequency converter.

15. The electric power converter of claim 8, further comprising an output filter connected to the AC output of the electric power converter wherein the second switching frequency is at least twice as high as a resonance frequency of the output filter.

16. A control system for an electric power converter, which electric power converter comprises a plurality of controllable power semiconductor switches and an AC output with one or more phases, the control system including a processor, and a memory storing instructions that, when executed by the processor, cause the processor to:

control the electric power converter to operate in a grid-forming mode of operation, including controlling the plurality of controllable power semiconductor switches to provide and sustain an AC voltage of a predetermined magnitude and a predetermined frequency at an AC network connected to the AC output of the electric power converter such that the controllable power semiconductor switches are operated at a first switching frequency;

detect a short-circuit fault in the AC network connected to the AC output of the electric power converter during the operating of the electric power converter in the grid-forming mode of operation; and in response to the detecting of the short-circuit fault, control the plurality of controllable power semiconductor switches to provide an AC current of at least a predetermined magnitude to the AC network connected to the AC output of the electric power converter such that the controllable power semiconductor switches are operated at a second switching frequency, wherein the second switching frequency is lower than the first switching frequency.

* * * * *